Patented Nov. 23, 1926.

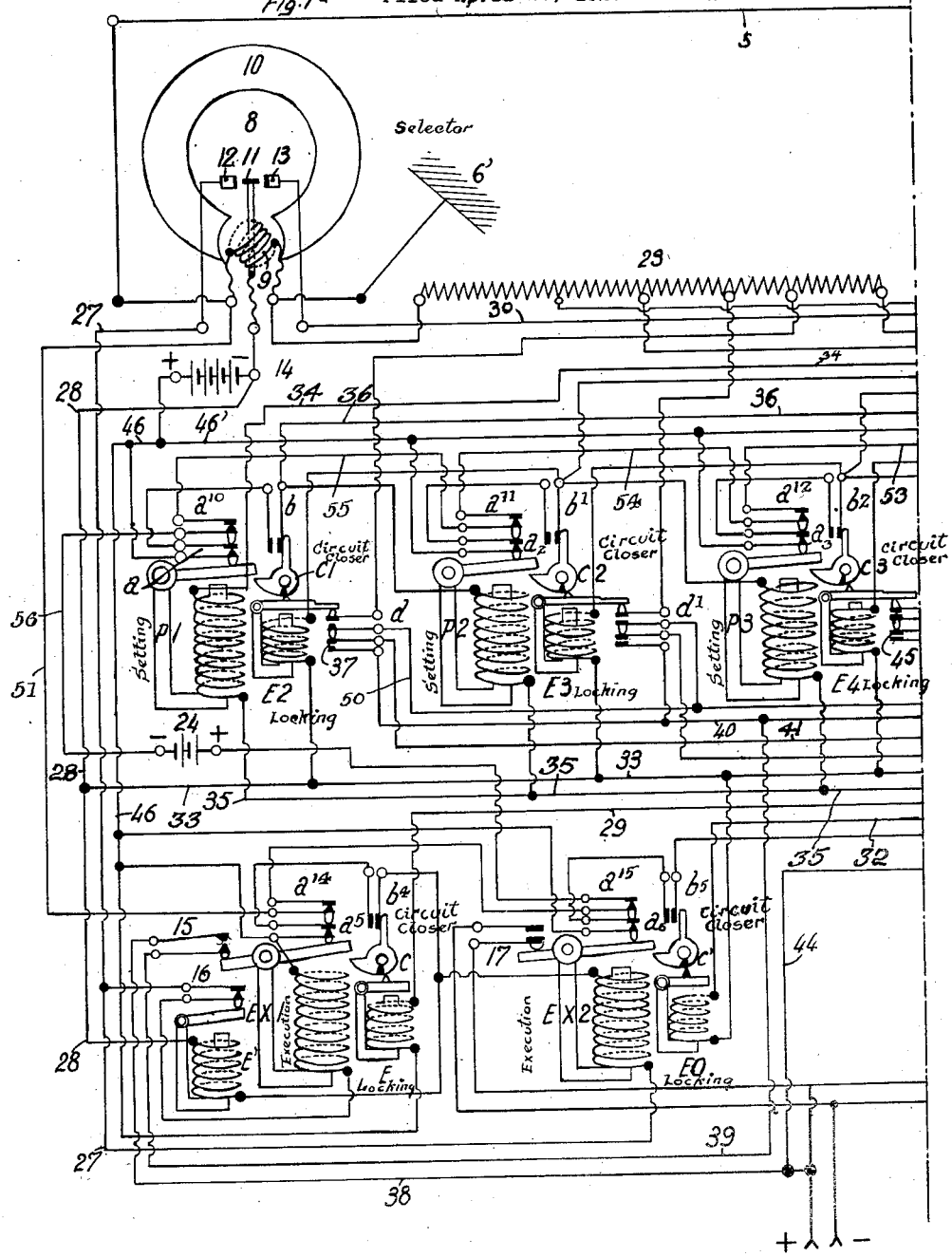
Nov. 23, 1926.  1,607,868
L. L. E. CHAUVEAU
AUTOMATIC SWITCH FOR DISTANT CONTROL
Filed April 28, 1920   2 Sheets-Sheet 1

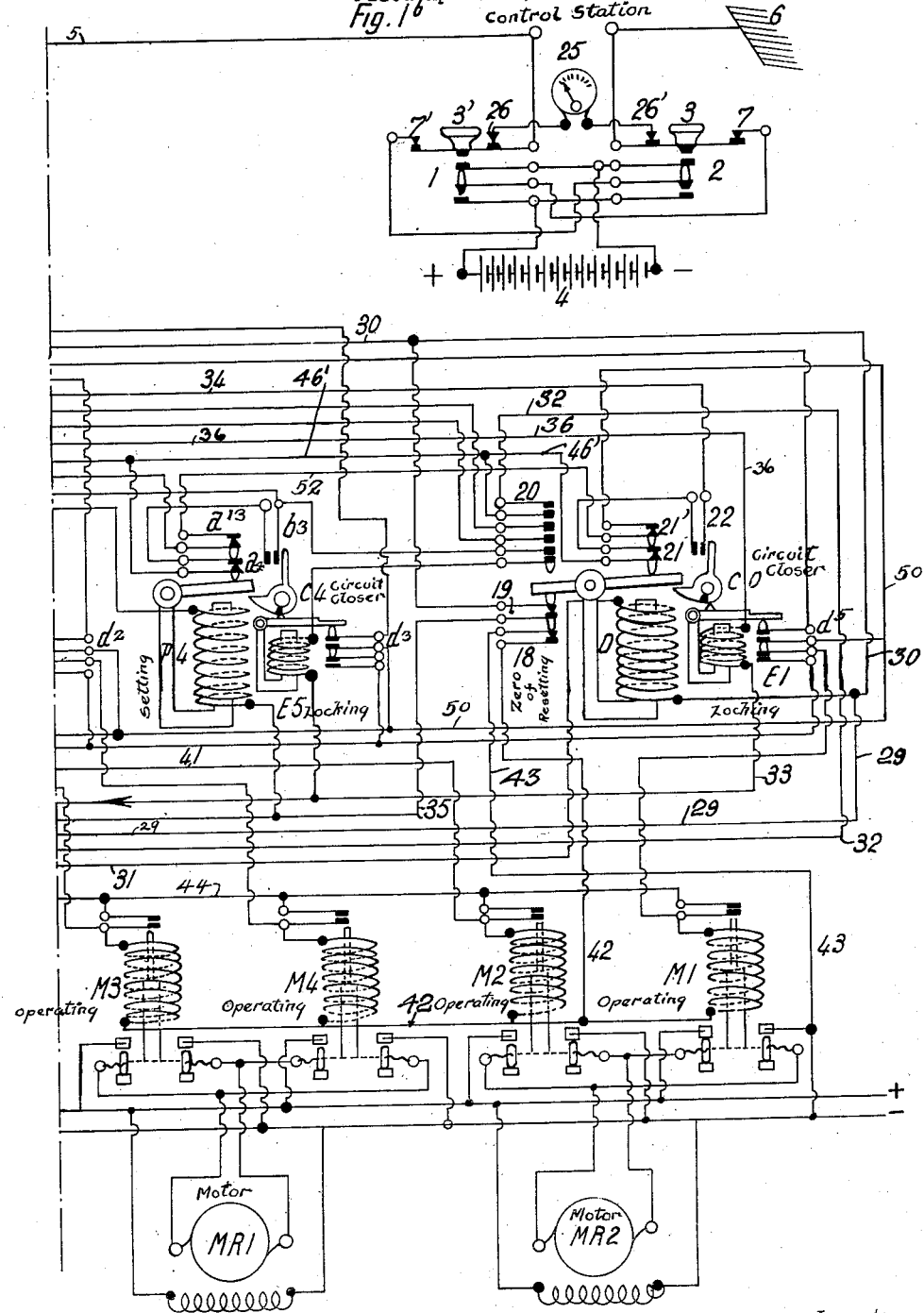

1,607,868

UNITED STATES PATENT OFFICE.

LOUIS LUCIEN EUGENE CHAUVEAU, OF PARIS, FRANCE.

AUTOMATIC SWITCH FOR DISTANT CONTROL.

Application filed April 28, 1920, Serial No. 377,343, and in France April 3, 1919.

(GRANTED UNDER THE PROVISIONS OF THE ACT OF MARCH 3, 1921, 41 STAT. L., 1313.)

In the following specification and claims, the word "signal" is used to indicate an impulse or series of impulses of code characters, and the function of which is to control the actuation of distant electrical elements; the word not having its usual meaning of directly imparting information by visual or audible means.

Systems of distant control have for their object, as the name indicates, to permit the control at a considerable distance of certain operations utilizing as a connection between the place of control and the place of execution of the operation either a single circuit of two conductors, or a single conductor with an earth return, or finally Hertzian waves.

Whatever may be the method of connection employed, any system of distant control, when it relates to multiple controls, comprises essentially three parts:

1. The control apparatus proper for sending from the place of control one or several controlling signals;

2. The selective apparatus which under the action of the control signals actuates a switch controlling the motors or other electrical elements at the place of execution of the operations;

3. The automatic switch operating system which under the action of the selector makes suitable connections so as to control either directly or by the intervention of relays the different operations to be effected.

The present invention has for its object an automatic switch operating system forming the third part of the system of distant control herein described. It is based on the application of known elements to a new combination which permits the conditions which are fundamental for the good operation of the system to be fulfilled. These conditions are as follows:

1. The control of the operations is made in two distinct stages: the setting and the execution. The setting does not necessarily cause the execution.

2. The successive setting or preparation for several operations allows their simultaneous execution.

3. The execution of one or of several set up operations is made exactly at the time desired by the operator, its duration is not limited, and it can be repeated as many times as is necessary and at any time.

4. The first setting signal which follows an execution signal causes the quick return of all the elements of the switch operating system and of the operated devices to a predetermined position which serves as the starting point for a new control.

5. The separation between the two signals for "setting" and "execution" permits the emission by the receiving or controlling station of an answer back signal (electrical, optical, acoustical, etc.) varying according to the operation which has just been prepared for.

6. Each control operation being represented by a distinct and separate group, the number of possible operations may be increased by increasing the number of groups without modifying the groups already installed. For example, the first group in the system illustrated in the drawings comprises the following elements: Setting magnet $P^1$, its contacts $a$, $a^{10}$, locking magnet $E^2$, its contacts $d$, and circuit closer $C^1$, with its contacts $b$.

7. The elements forming the switch operating system are of very simple construction and of a type common in electrical apparatus which facilitates their construction in quantity.

It results from what has just been said that the switch operating system forming the object of the present invention requires for its operation two quite distinct signals capable of being repeated several times. It is necessary, therefore, that the control station and the selector forming the first two parts of the control, of the kind hereinbefore described, should be arranged in such a manner that the first or control station $n$ can send signal impulses of two different types and the second or selector can selectively respond thereto.

For the purpose of clearness, I have represented the two stations as connected by a metallic circuit with an earth return. There are many ways of connecting and arranging the control station to emit two distinct signals, and the receiving station to select between them. A very simple method consists in utilizing as a control station a reversing switch by means of which a source of direct-current can be included in the circuit which is traversed by a current in one direction or the other, according to the connections formed by the reversing switch; the selector then comprises a set of polarized electromagnets or better a relay formed by a galvanometer, as will be hereinafter described. In the same manner alternating currents of different frequencies or a pulsating current of different frequencies can be employed in the line. As has already been stated, the invention has for its object only the control of a distant switch operating mechanism, and any means of connecting the controlling and the distant selecting stations may be employed.

The details of applicant's switching system may be summarized as follows: As illustrated, the system provides for the distant actuation of two electrical power switches, opened and closed respectively by motors $MR^1$ and $MR^2$, each rotating in one direction for opening and in the reverse direction for closing its power switch. This direction of rotation is determined, as to motor $MR^1$ for example, by the actuation of either switch operating magnet $M^3$ or $M^4$ as desired, which magnets control the operating circuits for the motor $MR^1$; motor $MR^2$ being controlled in a similar manner by $M^1$ and $M^2$. The function of the setting magnets $P^1$, $P^2$, $P^3$, and $P^4$ is to properly set the circuits for the switch operating magnets $M^1$, $M^2$, $M^3$ and $M^4$, respectively. Direct current is used and the control station 25 has two circuit closing keys 3 and 3' one of which sends normal current and the other a current reversed in direction.

The polarized or galvanometer relay 8 at the receiving station, when energized, closes either contacts 11—13, producing a setting function, or 11—12, producing an execution function, depending on which of the two sending keys 3 or 3' is depressed.

Setting magnets $P^1$ to $P^4$ have two common leads 35 and 34 passing through two contacts as 22 and 21, controlled by the zero or resetting magnet O.

If four setting signals are given in succession the first signal energizes magnet $P^1$, the second energizes magnet $P^2$, and cuts out $P^1$, the third energizes $P^3$ and cuts out $P^2$, and the fourth energizes $P^4$ and cuts out $P^3$.

If now the apparatus is to be set for energizing operating magnets $M^2$ and $M^4$, two setting signals are sent which sets magnet $P^2$ and cuts out magnet $P^1$ and a single execution signal is then sent which, by energizing executive magnet $EX^1$, locks the circuits for the later execution of operating magnet $M^2$, this action being hereinafter referred to as a "pre-execution". Two more setting signals are then sent and a single execution signal which in like manner through magnet $EX^2$ forms a preexecution for operating magnet $M^4$. The intended operation being now fully prepared for, and all circuits being properly set, a second execution signal is sent, whereupon the magnets $M^2$ and $M^4$ close the proper circuits to the switch motors $MR^1$ and $MR^2$ which then operate. Each setting magnet as $P^1$ has associated with it a circuit closer $C^1$ and releasing magnet $E^2$ whose functions are to control the circuits leading to the next setting magnet as $P^2$ through the contacts $a$ and $b$. Similar control of the first magnet $P^1$ is exercised by the zero magnet O through the contacts 22 and 21. The execution magnet $EX^2$ is in like manner controlled through contacts $a$ and $b$ of $EX^1$.

The distinguishing characteristic of this invention is the sequence of signals; and the possibility of selecting and thereafter simultaneously actuating one or more switches from among any number. By sending in a predetermined succession impulses on but two different wave-lengths or of two polarities, etc., one, two, three or four of the switches here represented may be closed simultaneously, and kept closed so long as the execution key is depressed; upon release of this key, the closure may be repeated as often and for as long as desired.

In its operation, a setting signal is sent. This brings relay $P^1$ into circuit. If the next signal is also for setting, relay $P^2$ comes in and relay $P^1$ drops out; and so forth. From this, it is apparent that any number of setting relays may be used. If, however, the next impulse be for execution, circuit closer $C^1$ would be locked in and remains in until released by the zero setting magnet. If the next impulse be setting, relay $P^2$ comes in as before; and so forth. It is, therefore, apparent that any number of the circuit closers as C may be locked in succession, for simultaneous operation later. If it is desired to operate the switches connected to these setting relays, the execution key is pressed twice; the second impulse being continued for as long as it is desired to have the switches remain closed, etc. Repeated closure of the execution key after the second closure, gives repeated closure of these switches. The operation of locking the circuit closures as C by a single execution impulse is called "pre-execution".

As stated, after the double execution impulse, all parts remain ready to accomplish the closure of the switches which are set up. When it is desired to restore to zero, after this double impulse, the setting key is manipulated to set up another switch. The first result of this setting impulse is to actuate the zero or clearing relay, which returns all members to zero.

From this, it is apparent that three operations at least are needed to close a switch—one setting signal and two execution signals. Clearing is effected by one setting following any two consecutive execution signals.

By way of example there will now be described a method of carrying out the invention with reference to the accompanying drawing which shows diagrammatically the connections between the various elements of a system disposed for four operations. It will be understood that the two half figures, Figs. 1$^a$ and 1$^b$, are on different sheets to avoid confusing the drawing by use of too small a scale.

A of the drawing represents a control station and B a selector apparatus, the connection between the control station and the selector being made by means of a single conductor and an earth return. The sections of the drawing grouped at P$^1$, P$^2$, P$^3$, P$^4$, EX$^1$, EX$^2$ and O represent electromagnets and contacts arranged to illustrate a plan of automatic switch. The parts shown at M$^1$, M$^2$, M$^3$ and M$^4$ represent operating magnets arranged in pairs for operating respectively motors MR$^2$ and MR$^1$. The operating magnets as well as the motors clearly do not form a part of the automatic switch. For the sake of simplicity, the drawing does not indicate the safety arrangements generally employed in this case to prevent the two magnets controlling the same motor from closing a short circuit by their simultaneous operation.

The control station comprises two sets of contact springs 1 and 2, controlled by a key 3 or 3' forming a reversing switch by means of which the battery 4 can be connected between the line 5 and the ground 6 and consequently send into the line, according to the key which is operated, a current in one direction or in the other direction. The safety contacts 7 and 7' prevent the battery 4 being short-circuited if, by reason of a wrong operation, the two keys were simultaneously pressed.

The selector consists of a direct current galvanometer 8 of the kind having a coil 9 moving in the field of a magnet 10, the needle being replaced by an arm carrying a moving contact 11 which can make connection with one of the two fixed contacts 12 and 13, according to the direction of the current passing through the coil 9 which is connected between the line 5 and the ground 6'. It is obviously necessary that the moving part of the galvanometer should be arranged so that the contact arm 11 may be vertical when no current passes through the coil.

The distantly controlled switch operating mechanism comprises four setting electromagnets P$^1$, P$^2$, P$^3$, P$^4$, two execution electromagnets EX$^1$ and EX$^2$, and an electromagnet O for returning to zero. Each of these magnets is provided with a locking magnet shown respectively at E$^2$, E$^3$, E$^4$, E$^5$, E, E$^0$ and E$^1$; consequently independently of the execution and the return to zero, each control operation is represented by a distinct group comprising a setting magnet and a locking magnet, and whenever it is necessary to increase the number of operations to be controlled, it suffices to add a "locking setting" group to the switch operating mechanism. The arrangement, therefore, is similar to bell or telephone indicators which is very useful from the practical point of view.

The setting magnets P$^1$, P$^2$, P$^3$, P$^4$ close two sets of contacts, one set directly by their armatures in the normal deenergized position, the other set $b$, $b^1$, $b^2$, $b^3$ by the intervention of small movable circuit closers $c^1$, $c^2$, $c^3$, $c^4$, each of which can turn on an axis when the armature of the corresponding setting magnet is attracted; when this armature returns to its normal position, the contact controlled by the circuit closer $c$ is maintained closed because the circuit closer is held against the action of the spring contacts by an abutment carried by the armature of the locking magnet forming part of the group of the setting magnet referred to.

By this arrangement, after the operation of one of the setting magnets, all the contacts above this magnet are maintained closed. These contacts are arranged in such a manner that, under these conditions, the setting magnet which has just operated is cut out of circuit, while the setting magnet immediately following is cut into circuit. This circuit includes also the battery 14 and the contacts 11, 13 of the selector 8, which are closed under the action of the setting signal sent out by the distant control. The method, for example, of cutting P$^2$ out of circuit is as follows: The circuit of this magnet P$^2$ is from the positive pole of the battery 14, by wire 46, contacts $a$, contacts $b$, magnet winding P$^2$, wire 35, contacts 19, wire 30, contacts 13 and 11, back to the negative pole of the battery 14. When the locking magnet E$^2$ operates, the contacts $b$ are opened and magnet P$^2$ is cut out of circuit until magnet P$^1$ has once more closed $b$, which will not occur until zero magnet O has operated, as described hereafter. The setting magnets transmit, therefore, in succession the action caused by the setting signal.

Each successive setting magnet as P$^2$ controlling an operation is, as will be seen from the above, cut into circuit by the circuit closer above the locking magnet immediately preceding; consequently, it must act upon the locking magnet as E$^2$ of the preceding group in order to cut itself out of circuit. For this purpose, after having operated, it closes the circuit of this magnet as E$^2$ which liberates the circuit closer C, the setting magnet which has just operated is, therefore, cut out of circuit by reason of the opening of the contact controlled by this circuit closer C. But the locking magnet as E$^2$ just mentioned remains energized and closes the two sets of contacts located under its armature, one of these sets being included in the circuit of one of the operating magnets $M^1$, $M^2$, $M^3$, $M^4$, and it is the closure of this contact which constitutes the setting.

The execution magnet $EX^1$ is included in a circuit hereinafter more fully traced, comprising the battery 14 and the contacts 11, 12 of the selector 8 which are closed under the action of the signal "execution". At the first signal "execution" $EX^1$ attracts its armature which closes the contact 15 and consequently the circuit of the operating magnet in the series $M^1$ to $M^4$ that corresponds to the prepared operation. This operating magnet acts and closes its circuit directly by means of its upper contact and will remain, therefore, energized even if the transmission of the first execution signal is interrupted. This constitutes an operation of pre-execution, as hereinafter described.

After its operation, the execution magnet $EX^1$ acts like the setting magnets, that is to say it cuts itself out of circuit by energizing the magnet $E'$ which breaks the circuit through $EX^1$ at 16 and also through the action of its corresponding part C puts into circuit with the battery 14 and the contacts 11, 12 the second execution magnet $EX^2$. It is sufficient to send a second execution signal to cause the operation of $EX^2$ which by the contact 17 closes the supply circuit for the motors $MR^1$ and $MR^2$; thus the motors controlled by the prepared and pre-executed operation are caused to start. It is possible, therefore, to interrupt the execution signal and to repeat it as many times as necessary.

The execution magnet $EX^1$ forms a group with the locking magnet E, the latter being included in a circuit comprising the battery 14 and the setting contacts 11, 13 of the selector 8. It follows that after a first execution or pre-execution, it is sufficient to send a setting signal to liberate the circuit closer C of $EX^1$ and the latter is again ready to receive an execution signal. It will then be possible to send an execution signal to it or to continue the transmission of setting signals for preparing the second operation to be executed. The first execution signal coming after a setting signal will pre-execute the operation corresponding to this setting and the sending of a second signal of execution will bring about all the corresponding prepared and pre-executed operations. The setting magnet $EX^2$ is shown in the same return relation to zero magnet O as a setting magnet is shown to its next following preparation magnet. The return to zero magnet is also controlled by the contacts 11, 13 of the selector 8, consequently the first "setting" signal following two or several consecutive "execution" signals will cause the operation of the zero magnet O. The latter by this action breaks the circuit of all the setting magnets (contact 19) and that of all the operating magnets (contact 18). It causes the operation of the locking magnets $E^0$, $E^2$, $E^3$, $E^4$ and $E^5$ (contact group 20), that is to say the suppression of the last setting established; finally, in causing the action of $E^0$ it breaks its own circuit. It returns to the normal position, closes by its contacts 21, 22 the circuit of $P^1$, which causes the setting of the operation controlled by $P^1$. It, therefore, follows that after an execution, the first setting signal returns all the parts of the "switch" to their starting point and causes the setting of the first operation. To obtain a correct operation of the magnet O, it is necessary that the contacts controlled by this magnet should be governed in such a manner that 18 and 19 may be fully opened before the closing of the group of contacts 20 and that the contact of this group corresponding to $E^0$ should only close after the closure of the other contacts of the same group is quite completed; so that the breaks 18 and 19 operate before the action of the locking magnet $E^0$ and that the breaking of the circuit of the magnet O only takes place when the latter has accomplished all the operations which are necessary.

The control system includes a potentiometer comprising a fixed part formed by the winding of the coil of the selector 8 and a variable part which is the resistance 23. A battery 24 can supply this circuit when the setting magnets, the execution magnets and the zero magnets are in their normal position. Safety contacts $a^{10}$, $a^{11}$, $a^{12}$, $a^{13}$, $a^{14}$, $a^{15}$ are located for this purpose between the battery and the potentiometer.

For the purpose of repeating back or indicating at the control station, the actuation at the receiving station of the proper "setting" group, each group $P^1$—$E^2$, $P^2$—$E^3$, $P^3$—$E^4$, $P^4$—$E^5$, has a pair of contacts at $d$, $d^1$, $d^2$, $d^3$, respectively, one of which is connected to a selected tap on the potentiometric resistance 23. Thus, for example, when the locking magnet $E^2$ is energized in the manner set forth, the contacts at $d$ are closed. Current now flows from the positive pole of battery 24, contacts $a^{15}$ and $a^{14}$, wire 51, wire 5, contact 26, galvanometer 25, contact 26', ground 6, ground 6', potentiometer 23, the respective tap, contacts $d$, wire 50, contacts 21', wire 52, contacts $a^{13}$, wire 53, contacts $a^{12}$, wire 54, contacts $a^{11}$, wire 55, contacts $a^{10}$, wire 56, back to the negative pole of battery 24. The voltage of the battery 24 and the resistance of the potentiometer 23 are so selected with regard to the resistance of coil 9, that the leakage across this coil will not serve to operate the selector 8. The current flowing in this or the similar circuits, depending upon the tap of the potentiometer used, will cause a deflection of the galvanometer 25, the dial of which may be calibrated to indicate which of the respective contacts $d$, $d^1$, $d^2$, $d^3$, is closed; in the case illustrated, $d$. This current only flows when all the contacts $a^{10}$, $a^{11}$, $a^{12}$, $a^{13}$, $a^{14}$, $a^{15}$, $21'$ are closed, and hence the galvanometer 25 only gives the indication when the operation is fully set and ready for execution.

The working of the switch operating system is as follows:

When the different parts $C^1$, $C^2$, $C^3$, $C^4$, $C^0$, or $C'$, as the case may be, are in their normal position, the armatures of all the magnets are raised by their springs, the contacts controlled by the circuit closer C are open, the circuit closer C being forced back by its contact. All the contacts employed are of the blade type forming a spring and tend to remain open when they are not held closed by an opposing force.

The apparatus is set by pressing twice in succession on the key $3'$ and then once on the key 3, that is to say by sending into the line two execution signals followed by a setting signal. On each of the execution signals a current passes from the ground through battery 4, the coil 9 and the line which closes the contacts 11, 12 of the selector 8.

The first execution signal causes the current from the battery 14 to flow through the following circuit: positive terminal of battery 14, wire 46, winding of magnet $EX^1$, contact 16, wire 27, contacts 12, 11 and the negative terminal of the battery 14. $EX^1$ attracts its armature, opens its upper contacts $a^5$ and $a^{14}$, rotates the circuit closer C and closes the contact $b^4$.

At the interruption of the first execution signal the armature of $EX^1$ returns to its normal position; $a^5$, $a^{14}$ are closed and $b^4$ remains closed, C being locked by the armature of E. A current from the battery 14 then flows through the following circuit: positive terminal of battery 14, wire 46, contacts $a^5$ and $b^4$ of $EX^1$, magnet $E'$, wire 28 and the negative terminal of battery 14. The magnet $E'$ attracts its armature, breaks the contact 16 which cuts $EX^1$ out of the circuit controlled by 11, 12.

At the second execution signal, a current from the battery 14 follows the following circuit: the positive terminal of battery 14, wire 46, contacts $a^5$ and $b^4$ of $EX^1$, winding of $EX^2$, wire 27, contacts 11, 12 and the negative terminal of battery 14. The magnet $EX^2$ attracts its armature which opens the contacts $a^6$ and $a^{15}$ of $EX^2$ and closes $b^5$, the circuit closer C remaining locked by the armature of $E^0$.

At the interruption of the second execution signal $EX^2$ releases its armature which closes $a^6$ and $a^{15}$.

By pressing the setting key 3, the circuit, line 5, coil 9 and ground $6'$ is traversed by a current in the opposite direction to that of "execution" and closes the contacts 11, 13.

This setting signal causes the closure of the circuit of the magnet E, the circuit of which is as follows: the positive terminal of battery 14, wire 46, magnet E, wire 29, wire 30, contacts 13, 11 and negative terminal of battery 14. E attracts its armature, liberates C which breaks the contact $b$, deenergizing $E'$ and closing contact 16, whereby $EX^1$ is returned to the execution circuit and $EX^2$ is cut out of circuit by the break at $b$.

The same setting signal causes the closure of the circuit of the zero magnet O, which is as follows: positive terminal of battery 14, wire 46, contacts $a^6$ and $b^5$ of $EX^2$, wire 31, magnet O, wire 30, contacts 13, 11 to the negative terminal of battery 14. The magnet O attracts its armature which opens 21 and $21'$, closes 22 by $C^0$, which remains locked by the armature $E^1$; the set of contacts 20 is also closed.

Through the contact of $C'$ and the armature of $EX^2$ in the circuit just described, the magnet $E^0$ is energized, its circuit comprising positive terminal of battery 14, wire $46'$, upper pair of contacts 20, wire 32, magnet $E^0$, wire 33, wire 28 and negative terminal of the battery 14. Furthermore $E^0$ being energized, liberates $C'$, which breaks the contact $b^5$ of $EX^2$ and consequently the circuit of O. The zero magnet then releases its armature which closes the contacts 18, 19, 21 and $21'$ and opens the set of contacts 20.

At this moment the circuit of the first setting magnet $P^1$ is closed, this circuit comprising positive terminal of battery 14, wire $46'$, contacts 21 and 22, wire 34, magnet $P^1$, wire 35, contact 19, wire 30, contacts 13, 11 and negative terminal of battery 14. The magnet $P^1$ attracts its armature, rotates $C^1$ which remains locked by the armature of $E^2$ and maintains the contact $b$ of $P^1$ closed.

At the interruption of the first setting signal, $P^1$ releases its armature which closes the contact $a$ and consequently the circuit of $E^1$. This circuit comprises positive terminal of battery 14, wire 46, contacts $a$ and $b$ of $P^1$, wire 36, magnet $E^1$, wire 33, wire 28 and negative terminal of battery 14. $E^1$ being energized, attracts its armature which releases $C^0$ and breaks the circuit of $P^1$ at 22. The armature of $E^1$ closes two sets of contacts of which one is included in the circuit of the operating magnet $M^1$ controlling the motor $MR^2$.

The sending of two consecutive execution signals followed by a preparation signal has, therefore, had the effect of returning all the members of the switch operating system to their starting point and to prepare for the first operation, to wit the energizing of the motor MR². The apparatus is then ready to receive an order.

Let us suppose that it is now desired to cause the two motors MR¹ and MR² to rotate simultaneously; the first in the direction governed by its operating magnet M⁴, the second in the direction governed by its operating magnet M². The control consists in setting the switch operating system so as to be prepared for energizing operating magnets M² and M⁴ and simultaneously energizing them by the proper execution signal or impulse, so that the switch throwing motors MR¹ and MR² will be energized for rotation in the required directions.

The signal for operating M¹ (which may be called setting impulse No. 1) having been given and the aparatus set as has just been described, setting impulse No. 2 will be given and the apparatus set correspondingly, by sending the second setting signal, i. e. by pressing on the key 3, which will cause the closing of contact 11, 13 of the selector 8.

Under these conditions, preparation magnet P² is energized by a current flowing in the following circuit: the positive terminal of battery 14, wire 46, contacts $a$ and $b$ of P¹, magnet P², wire 35, contact 19, wire 30, contacts 13 and 11 and the negative terminal of battery 14. P² being energized, attracts its armature, rotates C² which closes $b^1$; this contact is held closed, C² being locked by the armature of E³.

On the interruption of the preparation signal, 11, 13 being broken, P² releases its armature which closes the contacts $a^2$ which causes E² to be energized by a current flowing in a circuit as follows: positive terminal of the battery 14, wire 46'; contacts $a^2$ and $b^1$ of P², magnet E², wire 33, wire 28, and negative terminal of battery 14. E² being energized attracts its armature, C¹ is unlocked, the contact $b$ of P¹ is broken which cuts P² out of circuit; at which moment the operation 2 hereinafter described is set by closure of the contact 37 of E².

This operation 2 forming part of the two which it is necessary to execute, an execution signal is then sent which operates EX¹ as previously described. EX¹ being energized closes the contact 15 which has for its object to energize the operating magnet M², the circuit of which is as follows: the positive supply lead, wire 38, contact 15, wire 39, wire 40, contact 37, wire 41, magnet M², wire 42, contact 18, wire 43 to the negative supply lead. M² being energized makes the connections of MR² and directly closes its own circuit locking up by the wire 44 and, when the setting contact 37 or the execution contact 15 are broken, MR² will remain energized. This constitutes the pre-execution of the signal.

On the interruption of the first execution signal, EX¹ releases its armature and, as has already been explained, cuts itself out of circuit by actuating E'.

A setting signal is then sent which by acting on E cuts EX¹ again into circuit. But as the last preparation effected was made by P², which was thereby cut out of circuit, this new setting signal causes the energizing of P³.

On the interruption of this signal, magnet P³ by closing its contacts $a^3$ and $b^2$ energizes E³ which sets the operation closing M³, cuts P³ out of circuit and cuts P⁴ into circuit. The setting signal may then be sent which energizes P⁴, the circuit of which is as follows: positive terminal of the battery 14, wire 46', contacts $a^3$ and $b^2$ of P³, magnet P⁴, wire 35, contact 19, wire 30, contacts 13, 11 and negative terminal of battery 14. P⁴ being energized attracts its armature, rotates $c^4$ which, held by the armature of E⁵, closes $b^3$.

On the interruption of this preparation signal, P⁴ releases its armature, closes its contact $a^4$ which energizes E⁴, the circuit of which is as follows: positive terminal of battery 14, wire 46', contacts $a^4$ and $b^3$ of P⁴, magnet E⁴, wire 33, wire 28 and negative terminal of battery 14. E⁴ attracts its armature, closes the contact 45 which constitutes the preparation of the fourth operation.

An execution signal is then sent which causes EX¹ to operate, as has been already described, and causes the pre-execution of the fourth operation by energizing operating magnet M⁴ which operates under the same conditions as M², but is controlled by the contact 45 of E⁴, the two operations controlled are thus pre-executed.

On the interruption of the execution signal, EX¹ cuts itself out of circuit and puts EX² into circuit.

At the time when it is thought necessary, the second execution signal is sent. EX² attracts its armature which closes the contact 17, the two motors, the circuits of which are closed by M² and M⁴, start into operation; this lasts during all the time of sending the execution signal. This signal can be interrupted and repeated as many times as is necessary. At each interruption, the opening of 17 is caused and at each closure this contact is closed.

Once the execution is sufficiently effected, a setting signal will be sent which causes the operation of the return to zero magnet O, the circuit of which is as follows: positive terminal of the battery 14, wire 46, contacts $a^6$ and $b^5$ of EX², wire 31, magnet O, wire 30, contacts 13, 11 and negative terminal of the battery 14; this signal causes also the operation of E, that is to say, it cuts EX² out of the execution circuit and EX¹ into this circuit. The magnet O in operating breaks; at 18 the circuit of the operating magnets which return to their normal position; at 19 that of the setting magnets, then closes the set of contacts 20 which causes the liberation of the parts $C^1$, $C^2$, $C^3$, $C^4$ and $C'$, which are locked; finally, it breaks by the last contact 20 its own circuit; it releases its armature which closes at 21 and 22 the circuit of $P^1$ which is thereby energized, the operating mechanism is then ready to receive a new order.

The control operation has, therefore, consisted in sending the setting signals 1 and 2, then an execution signal, then setting signals 3 and 4, then an execution signal, this constituting the pre-execution. The execution signals following have permitted the operation to be repeated. The first setting signal following two or more execution signals has returned all the elements of the automatic switch operating system to a predetermined point, the preparation of the order 1.

The present description is only given by way of example. It will be clearly understood that I do not wish to be limited to the precise details of construction illustrated, as changes may be readily made without departing from the spirit and scope of the invention.

What I claim is:

1. In a distant control system, a setting key to transmit setting signals, an execution key to transmit execution signals, a receiving relay responsive to and selecting between said signals, a plurality of setting magnets, primary operating switches each controlled by one of said magnets, a pre-execution magnet, a secondary switch controlled thereby, an execution magnet, a tertiary switch controlled thereby, means connecting said receiving relay and said setting, pre-execution and execution magnets, an operating magnet connected to each respective primary switch, locking means for each of said primary switches connected to said pre-execution magnet, and means connecting said execution magnet with all of said operating switches, whereby, in accordance with the transmitted signals, the circuits of a selected operating switch are arranged for the later actuation of such switch by the setting magnet and its switch, the switch locked by said pre-execution magnet, and then the execution magnet brought into action to complete the circuits of the operating switch.

2. In a distant control system, a sending station having means to transmit independent setting and execution signals, a receiving station having means selectively responsive to such signals and comprising a receiving relay selecting between said signals, a plurality of setting magnets connected with said relay, operating switches each controlled by one of said setting magnets, execution magnets connected to said relay, means including said relay to successively operate said setting relays and their respective switches upon transmission of predetermined setting signals, control switches associated with the respective execution magnets, and means connected with said execution magnets to effect the actuation of the corresponding control switch upon a subsequent transmission of an execution signal.

3. In a distant control system, a sending station having means to transmit independent setting and execution signals, a receiving station having means selectively responsive to such signals, a series of electromagnetic setting devices, operating switches each controlled by one of said setting devices, a plurality of electromagnetic execution devices including pre-execution and final execution devices, means including said responsive means to select any one of said setting devices upon transmission of predetermined setting signals, and means including said responsive means to select any one of said execution devices upon transmission of predetermined execution signals, means controlled by a pre-execution device for rendering the selected setting device effective to control its operating switch and means controlled by a final execution device to render the operating switch effective to execute the control.

4. In a distant control system, a sending station having means to transmit independent setting and execution signals, a receiving station responsive to such signals and comprising a receiving relay responsive to and selecting between such signals, a plurality of setting groups each including a setting magnet and a primary switch controlled thereby, a locking magnet, an execution magnet translating mechanism controlled thereby, a zero setting magnet, means connecting said relay and said plurality of setting groups, means to successively disconnect said setting magnets upon the transmission of the following setting impulse, means connecting said execution magnet and said plurality of setting groups to actuate said locking magnet of the groups upon transmission of a single execution signal, and means connecting said zero setting magnet and said setting groups and execution magnet to effect a restoration to zero upon a subsequent transmission of an execution signal.

5. In a distant control system, a sending station having means to transmit independent setting and execution signals, a receiving station having means responsive to such signals, a series of setting magnets, operating switches each controlled by one of said setting magnets, means including said responsive means to actuate a selected one of said magnets upon transmission of a predetermined succession of setting signals, means to lock the switch controlled by such selected setting magnet in operative position upon receipt of an execution signal, means to connect such selected magnet to operate an execution device upon transmission of a second consecutive execution signal.

6. In a distant control system, a sending station having means to transmit independent setting and execution signals, a receiving station having means selectively responsive to such signals, a series of setting magnets, operating switches each controlled by one of said setting magnets, means including said responsive means to successively connect the magnets of said series upon receipt of setting signals, means to lock the switch controlled by the connected magnet upon receipt of a single execution signal, means to connect an execution device to said connected magnet upon receipt of a double execution signal, and means to restore to zero upon receipt of a setting signal following a double execution signal.

In testimony whereof I affix my signature.

LOUIS LUCIEN EUGENE CHAUVEAU.